March 28, 1939. A. ROMAN 2,151,802
GRINDING WHEEL TRIMMING DEVICE
Filed Oct. 27, 1937 2 Sheets-Sheet 1
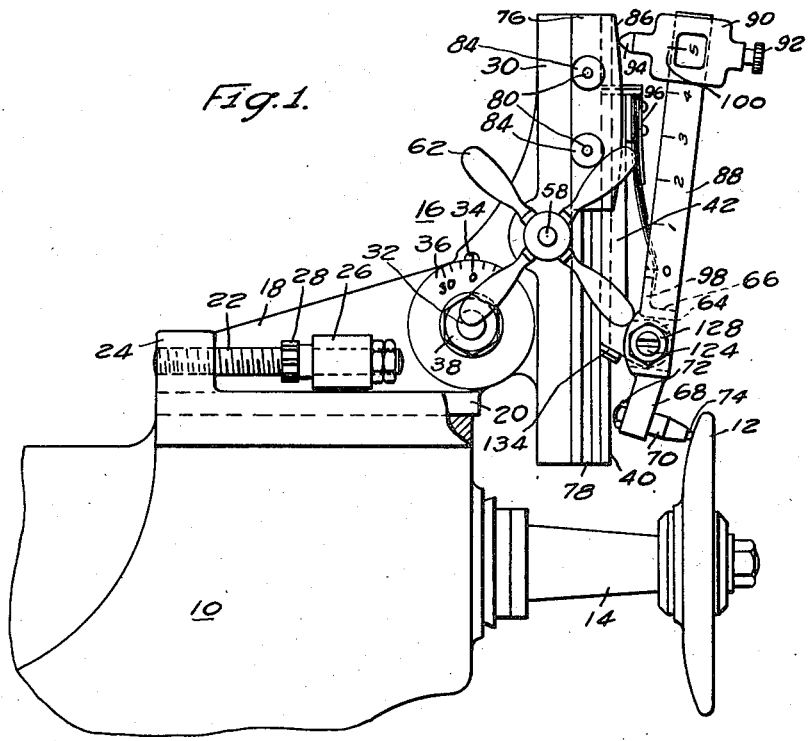
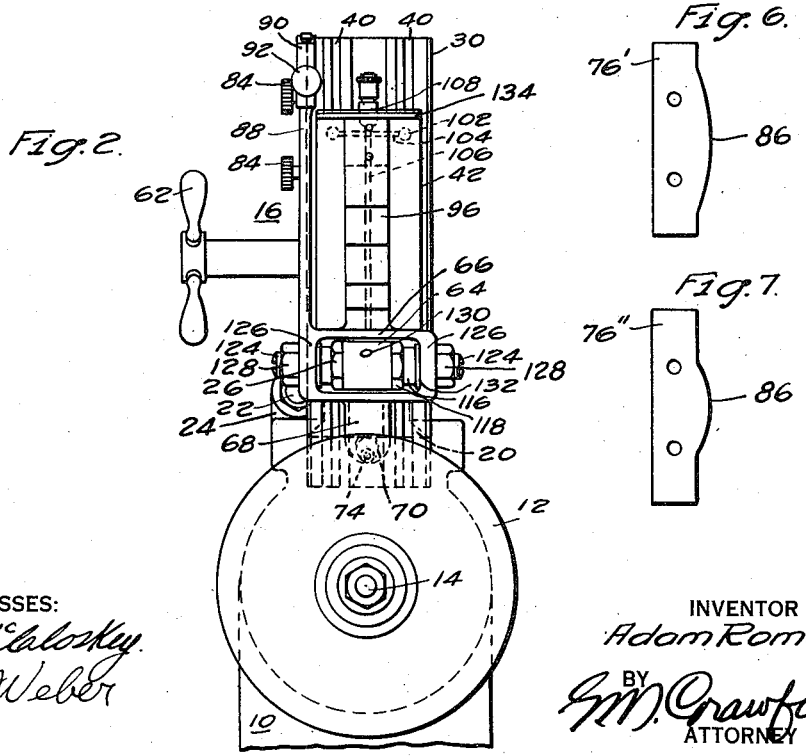
WITNESSES:
E. A. McCloskey.
Joe Weber
INVENTOR
Adam Roman.
BY
G. M. Crawford
ATTORNEY

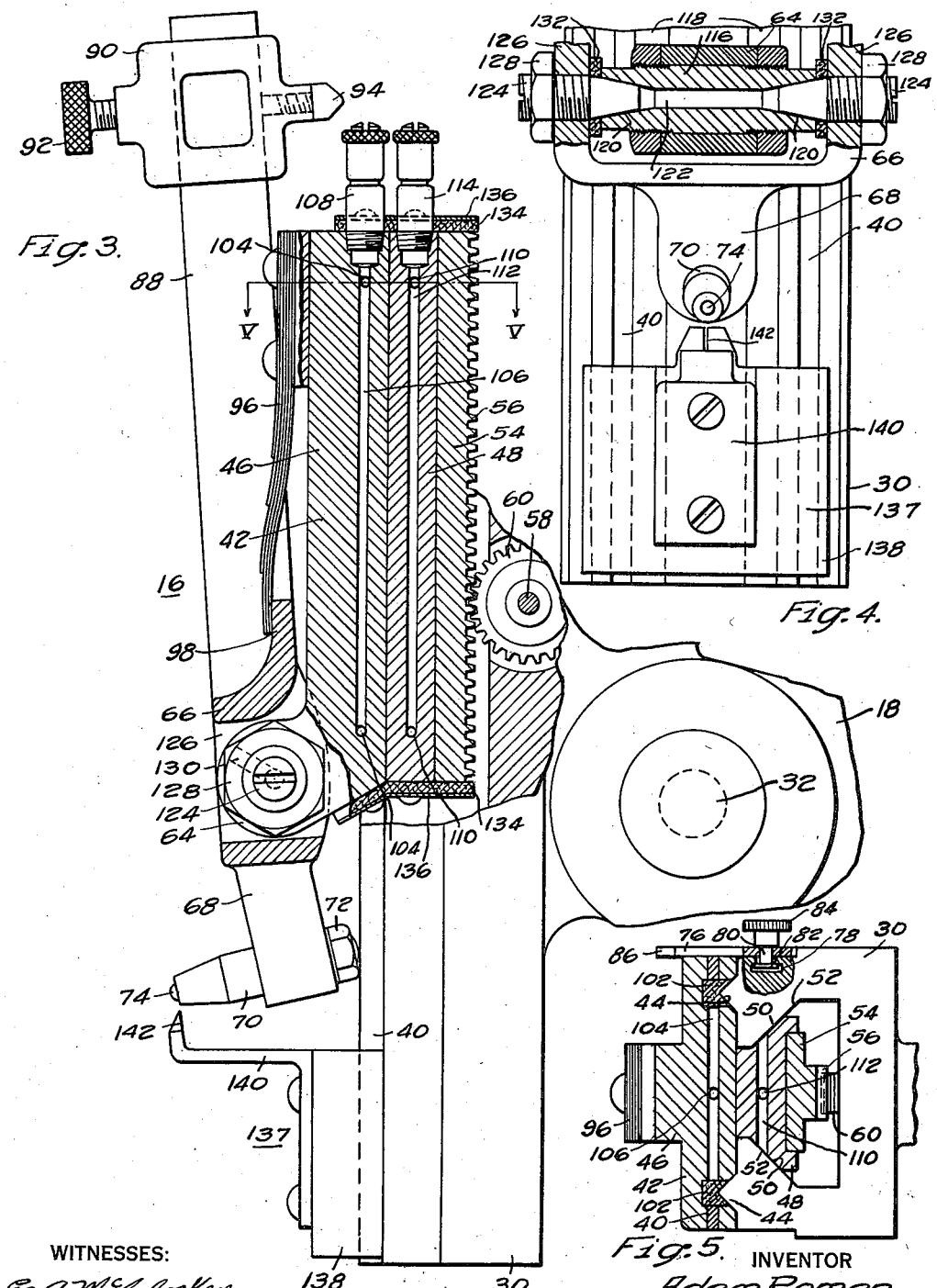

Patented Mar. 28, 1939

2,151,802

UNITED STATES PATENT OFFICE 2,151,802

GRINDING WHEEL TRIMMING DEVICE

Adam Roman, Pittsburgh, Pa., assignor to Westinghouse Electric & Manufacturing Company, East Pittsburgh, Pa., a corporation of Pennsylvania Application October 27, 1937, Serial No. 171,357

8 Claims. (Cl. 125—11)

My invention relates, generally, to grinding wheel trimming devices and, more particularly, to trimming devices for producing the grinding wheel contour necessary for producing cutting faces radial and perpendicular to the axis at any point along the axis on the teeth of gear cutting hobs having helical gashes.

Grinding wheels which are used for grinding non-helical cutting faces ordinarily have straight contours. When such a grinding wheel is used to grind the cutting faces of gear cutting hobs which have helical gashes, the resulting cutting face consists of a warped surface, no part of which is perpendicularly radial to the axis. Gears cut with such a hob will have teeth, the profile of which will be different than that desired or for which the hob was designed.

In order to properly grind the cutting face of gear cutting hobs having helical gashes so that the cutting face will be straight and radial, it is necessary that the working face of the grinding wheel have a curved contour of a configuration determined by the dimensions of the hob which is to be ground.

An object of my invention is to provide a trimming device for a grinding wheel which shall function to trim the working face of the grinding wheel to a predetermined contour.

Another object of the invention is to provide a trimming device for a grinding wheel which shall function to trim the working face of the grinding wheel to such a contour as will produce straight radial cutting faces on a gear cutting hob having helical gashes.

A further object of the invention is to provide a trimming device for a grinding wheel which may be adjusted to trim the working face of the grinding wheel to any of a large variety of contours.

Still another object of the invention is to provide a trimming device for a grinding wheel which may be permanently mounted on the grinding machine and whose trimming tool may be moved out of trimming position when not in use.

A further object of the inventiton is to provide a trimming device for a grinding wheel having exposed slideways thereon with a novel system for lubricating the slideways and for keeping the slideways free from dust and other foreign matter.

Another object of the invention is to provide a trimming device for a grinding wheel which shall be provided with an adjustable trimming tool and a gauge device for determining the proper position of the trimming tool.

A further object of the invention is to provide a grinding wheel trimming device, having a pivotal mounting means for its trimming tool, with a novel oiling system and dust excluding system for its pivotal bearings.

These and other objects and advantages of the invention will be apparent from the following detailed description taken in connection with the accompanying drawings, in which like parts are designated by like reference characters, and in which Figure 1 is a view in side elevation showing a trimming device embodying the principal features of the invention mounted on the grinding machine with its trimming tool in operative position;

Fig. 2 is a view in front elevation of the device of Fig. 1;

Fig. 3 is a view in side elevation of the trimming device taken from the opposite side from the elevation view of Fig. 1 with some of the parts in section and showing the centering gauge for the trimming tool in position on the slideways of the swivel head;

Fig. 4 is a front elevational view of the lower portion of the device showing the centering gauge in position and showing the pivot bearings for the trimming tool arm in cross section;

Fig. 5 is a cross sectional view of the sliding head with the swivel head outlined thereon and showing the adjustable support for the guide template on the side of the swivel head; and Figs. 6 and 7 are side elevation views of interchangeable templates having different curvatures.

In carrying out the inventiton, I provide a base plate mounted on the grinding machine and adjustable along a line parallel to the axis of rotation of the grinding wheel. A swivel head is pivotally mounted on the base plate and has adjusting means for positioning it at a desired angle in a plane through the axis of rotation of the grinding wheel.

A sliding head is mounted to slide rectilinearly on the swivel head along a line which passes through the axis of rotation of the grinding wheel on cooperating slideways on the swivel head and the sliding head and a hand wheel is provided for producing this rectilinear motion when desired. An arm is pivotally mounted on the sliding head for motion in a plane through the axis of rotation of the grinding wheel and has a trimming tool mounted thereon. A follower on the arm is made to bear against a template mounted on the swivel head so that when the sliding plate is moved rectilinearly, the trimming tool will have a pivotal motion determined by the shape of the template and will move in a path similar to the contour of the template.

The follower member is adjustable to vary the radius of rotation about the pivot point of the arm and templates of several different sizes are provided so that the desired trimming tool motion may be produced. A centering gauge is provided for determining the position of the trimming tool cutting edge so that the edge may be positioned to travel in a plane through the axis of the grinding wheel.

Referring now to the drawings, a grinding machine 10, having a grinding wheel 12 mounted on a spindle 14, is provided with a trimming device 16 for shaping the grinding surface of the grinding wheel 12 to the contour required for the grinding operation which is to be performed by the grinding wheel.

A base plate 18 is mounted on the machine 10 by means of slideways 20, best shown in Fig. 2, for sliding movement in a direction parallel to the axis of rotation of the grinding wheel 12. The sliding movement of base plate 18 is provided by screw bolt 22 which threadably engages the shoulder 24 of the machine 10 and has one end rotatably mounted in the lug 26 of base plate 18. The screw 22 may be turned by means of nut 28 to provide the sliding motion between the base plate 18 and the machine 10.

A swivel head 30 is pivotally mounted on base plate 18 by means of pin 32 and carries a marker 34 which is positioned to cooperate with a scale 36 which is fixed to base plate 18, so that any predetermined angular relation between the swivel head 30 and base plate 18 may be established. A nut 38 cooperating with the pin 32 may be tightened to hold the swivel head 30 in the desired adjusted angular relation with respect to the base plate 18. Slideways 40 are provided on the swivel head 30 and a sliding head 42 is provided with cooperating slideways 44 so that sliding head 42 may have a rectilinear sliding movement along the face of the swivel head 30.

The form of the swivel head 30 and sliding head 42 is best shown in the sectional view of Fig. 5. Referring to Fig. 5, it will be seen that the sliding head 42 comprises three members, a member 46 which has slideways 44 formed therein, a member 48 which has sliding surfaces 50 cooperating with sliding surface 52 of the swivel head 30 and a member 54 which serves as a rack having a row of rack teeth 56 formed in one of its surfaces.

A pin 58 (Figs. 1 and 3) is rotatably mounted on the swivel head 30 and carries a rack or a pinion 60 which cooperates with the rack member 54 to cause a sliding movement of sliding head 42 on swivel head 30 when the pinion 60 is actuated by rotation of the shaft 58 by means of handle 62.

The sliding head 42 has a forwardly extending member 64 formed thereon and an arm 66 is pivotally mounted on this member 64 on an axis which is substantially normal to the axis of rotation of the grinding wheel 12. A leg 68 of the arm 66 carries a trimming tool holder 70 which extends through the leg 68 and is secured thereto by a nut 72. A trimming tool 74 which may be a diamond or any suitable cutting material is mounted upon tool holder 70.

A guide member or template 76 is adjustably mounted upon swivel head 30. The adjustable mounting of template 76 comprises a T-shaped slot 78, a section of which is best shown in Fig. 5, and bolts 80 which have head portions 82 cooperating with the T-shaped slot in the swivel head 30 and extending through the template 76. Thumb screws 84 cooperate with the bolts 80 to hold the template 76 in its adjusted position. The template 76 has a surface 86 which has a contour similar to that to which it is desired to trim the grinding wheel 12. Several templates having different curvatures, such as templates 76' and 76", shown in Figs. 6 and 7 are provided and are interchangeable with template 76 so that different grinding wheel contours may be produced.

The leg 88 of arm 66 has a follower member 90 slidably mounted thereon. Follower member 90 is provided with a thumb screw 92 for securing the follower member in its adjusted position on the leg 88. The follower member 90 is provided with a hardened follower point 94 which engages the surface 86 of the template 76. A spring 96, having one end secured to the sliding plate 42, and its other end in engagement with a shoulder 98 of arm 66 is used to bias the arm 66 in a direction to maintain the engagement of follower point 94 and the surface 86 of the template 76. The leg 88 of pivoted arm 66 has a series of graduations thereon as shown, and follower head 90 has a marker 100 thereon positioned to cooperate with the scale of graduations on the leg 88.

A lubricating system for the slideways 40 and 52 of the swivel head 30 and 44 and 50 of the sliding head 42 is provided and is best shown in Figs. 2, 3 and 5. Plugs 102 of felt or other similar material are set into the sliding head 42 near the ends of the slideways 44. Passages 104 interconnect the plugs 102 at the two ends of the sliding head 42 and a passage 106 extends through the member 46 to interconnect the passages 104 and to provide an inlet for oil to the passages 104. A capping member 108 is mounted on the member 46 in a position to conduct oil into the passage 106 so that it may flow through passages 104 to the plugs 102 and be applied to the slideways 40 of swivel head 30 by the plugs 102.

In a similar manner, passageways 110 are provided in member 48 interconnecting the slideways 50 and a feeder passage 112, which is provided with capping member 114, interconnects these cross passages 110.

The details of construction of the pivoting means for the arm 66 are best shown in Figs. 3 and 4. Referring to Fig. 4, the forwardly extending member 64 of sliding head 42 has extending through it a sleeve member 116 which is held in position with respect to the member 64 by means of nuts 118 which threadedly engage the sleeve member 116, as shown. The sleeve member 116 has conical bearing surfaces 120 formed therein, and these bearing surfaces are interconnected by a passage 122. Pin members 124 having conical bearing surfaces cooperating with the bearing surfaces 120 on the sleeve member 116, threadedly engage the side members 126 of the pivoted arm 66 and are held in the properly adjusted position by locking nuts 128. The bearing surfaces 120 of sleeve member 116 may be supplied with lubricating oil through a passage 130 in the member 64. Felt washers 132 are mounted on the supporting screws 124 to fill the gap between the members 126 and the ends of the sleeve member 116 to prevent dust or other foreign matter from coming in contact with the bearing surfaces between the pin 124 and the sleeve 116.

Felt pads 134 are mounted on the ends of the sliding head 42 in a position to engage the slideways of the swivel head 30 to prevent dust and other foreign material from coming in contact with the engaging parts of the slideways on the sliding head 42 and the swivel head 30. The felt pads 134 may be held in position by plate members 136, which may be secured to the sliding head 42 in any suitable manner.

A gauge 137 is provided for properly centering the cutting edge of the trimming tool 74 which comprises a plate member 138 which is provided with ways formed to cooperate with slideways 40 of swivel head 30 so that when the plate member 138 is held against the swivel head 30, it will be accurately positioned thereon. An arm member 140 is mounted on the plate 138 and has a marker 142 thereon which indicates the position which the cutting edge of the tool 74 should occupy in order that the tool may travel in a plane which passes through the axis of rotation of the cutting wheel 12. With this arrangement, in the event that the cutting tool 74 should be mounted off center on its support 70, the nut 72 may be loosened and the support 70 rotated until the cutting tool 74 occupies the position indicated by the mark 142. The nut 72 may then be tightened to clamp the tool 74 in the desired position. The gauge 137 is not secured to the swivel head 30 but is merely held thereagainst by the hand while the centering of the cutting tool 74 is being determined and adjusted.

In the operation of the device, when it is desired to trim the grinding wheel 12, a template 76, corresponding to the contour to which it is desired to trim the grinding wheel, is chosen, and secured in the proper position to the swivel head 30. The follower head 90 is then positioned on the leg 88 of arm 66 to so cooperate with the template 76 as to produce the desired motion of tool 74 when a pivotal motion of arm 66 is produced by engagement of follower 90 with the surface 86 of template 76 when the sliding head 42 is moved by turning the handle 62. While the grinding wheel 12 is rotating, the handle 62 is turned to move the sliding head 42 along the swivel head 30 and the trimming tool 74 will engage the surface of the grinding wheel 12 and trim it to the desired contour.

The curvature of the grinding surface of the grinding wheel 12 may be made to vary, either by providing templates 76 having surfaces 86 of different curvatures as shown in Figs. 6 and 7 and adjusting the follower head 90 to cooperate therewith, or by varying the position of any particular template with respect to the pivotal axis of arm 66 and adjusting the follower 90 to cooperate with the template. It will be seen that with a template of a given curvature placed in such a position as to make the distance between the pivotal axis of arm 66 and the cutting edge of the tool 74 the same as the distance between the pivotal axis of the arm 66 and the follower point 94, the curvature to which the grinding wheel 12 will be trimmed will be the same as that of the template 76. If now the same template is moved to a position such that the follower point 94, to cooperate with the template properly, must be positioned at a distance from the pivotal point of arm 66 which is twice the distance between the pivotal point 66 and the cutting edge of the tool 74, the curvature to which the grinding wheel 12 will be trimmed will be half the curvature of the template 76.

By means of the pivotal mounting of the swivel head 30 on the base plate 18 and the gauge 36 and marker 34 on the base plate 18 and swivel head 30, respectively, the swivel head may be mounted at any desired angle with respect to the axis of rotation of the grinding wheel 12 so that the desired contour of the grinding wheel may be produced.

While the trimming device is not in use, the hand wheel 62 may be operated to elevate the trimming tool 74 to a position where it will not engage the grinding wheel or interfere with the work upon which the grinding wheel is being used.

It will be seen that I have provided a simple and effective trimming device for accurately trimming a grinding wheel to any desired contour and which may be made a part of the grinding machine or permanently mounted thereon without interfering with the operation of the grinding wheel during the grinding process.

In compliance with the requirements of the patent statutes I have shown and described herein the preferred embodiment of my invention. It is understood, however, that the invention is not limited to the precise construction shown and described but is capable of modification by one skilled in the art, the embodiment herein shown being merely illustrative of the principle of my invention.

I claim as my invention:

1. In a trimming device for a grinding wheel, a base plate, means for adjustably positioning said base plate in a direction parallel to the axis of the grinding wheel, a swivel head, means for adjustably mounting said swivel head on said base plate so that it may be positioned at various angles in a plane through the axis of rotation of the grinding wheel, a trimming tool, means mounting said tool on said swivel head for pivotal movement in said aforementioned plane, means on said swivel head for imparting a rectilinear motion in said aforementioned plane to said pivotal mounting means, and means for imparting a predetermined pivotal movement to said tool simultaneously with the rectilinear movement of said pivotal mounting means.

2. In a grinding wheel trimming device, a base plate, means for adjustably positioning said base plate in a direction parallel with the axis of the grinding wheel, a swivel head, means for adjustably mounting said swivel head on said base plate so that it may be positioned at various angles in a plane through the axis of rotation of the grinding wheel, an arm, means pivotally mounting said arm on said swivel head, means mounting said arm mounting means for rectilinear movement on said swivel head, a trimming tool mounted on said arm, guide means mounted on said swivel head and engaging said arm, said guide means being so shaped as to impart predetermined pivotal movements to said arm as said arm mounting means is moved rectilinearly.

3. In a grinding wheel trimming device, a supporting head, a sliding head, means mounting said sliding head on said supporting head for rectilinear motion in a line which passes through the line of the axis of rotation of the grinding wheel, means for imparting said rectilinear motion to said sliding head, an arm member, means pivotally mounting said arm member on said head for movement in a plane which passes through the axis of rotation of the grinding wheel, a guide member of predetermined contour mounted on said supporting head adjacent said arm, means for adjusting the position of said guide member with respect to the pivot for said arm, a follower member, means for adjustably positioning said follower member on said arm for cooperation with said guide member, a trimming tool mounted on said arm in the aforementioned plane and in cooperative relation with the grinding wheel, and resilient means biasing said arm to maintain contact between said follower member and said guide member.

4. In a grinding wheel trimming device, a supporting head, a sliding head, means mounting said sliding head on said supporting head for rectilinear motion comprising cooperating slideways on said supporting head and said sliding head, means for oiling said slideways comprising main oil channels in said sliding head substantially parallel with said slideways and branch channels from said main channels to said slideways and oil wick means so positioned in certain of said branch channels as to wipe on said slideways of said supporting head, means for imparting said rectilinear motion to said sliding head, a trimming tool mounted on said sliding head for pivotal movement in a plane which passes through the line of the axis of rotation of the grinding wheel, and means for imparting predetermined pivotal movements to said tool simultaneously with said rectilinear movement of said sliding head.

5. In a trimming device for a grinding wheel, a bifurcated arm, means for pivotally mounting said arm adjacent a grinding wheel, said pivotal mounting means comprising a sleeve member having a bearing surface in each end thereof, the branches of said arm overlying the ends of said sleeve member, supporting pins extending through said branches of said arm and engaging said bearing surfaces of said sleeve member, an oil channel extending through the wall of said sleeve member, a packing washer between each end of said sleeve member and the adjacent branch of said arm for preventing foreign substances from coming into contact with said bearing surfaces, means mounting said sleeve for substantially rectilinear movement, and means for causing predetermined pivotal movements of said arm as said pivotal mounting means is moved rectilinearly.

6. In a grinding wheel trimming device, a supporting head, a sliding head, means mounting said sliding head on said supporting head for rectilinear motion comprising cooperating slideways on said supporting head and said sliding head, a trimming tool adjustably and pivotally mounted on said sliding head and means for checking the position of the cutting portion of said trimming tool comprising a separate base plate having slideways spaced to cooperate with the slideways of said supporting head to accurately position said base plate with respect to said supporting head when said base plate is held thereagainst, and a gauge device bearing an indication of the desired position of the cutting portion of said tool mounted on said base plate.

7. In a device for trimming a grinding wheel to a predetermined contour, a supporting head, a sliding head mounted for substantially rectilinear movement on said supporting head, means for imparting said rectilinear movement to said sliding head, an arm pivotally mounted on said sliding head, a guide template, means for adjustably positioning and securing said template on said supporting head, a follower member, means for adjustably positioning said follower member on said arm in co-operative relation with said template so that a pivotal movement determined by the contour of said template and the spacing of said template and said follower from the pivotal axis of said arm may be imparted to said arm as said rectilinear movement is imparted to said sliding head, and a trimming tool mounted on said arm in cooperative relation with the grinding wheel.

8. In a grinding wheel trimming device, a trimming tool, a bifurcated supporting arm for said tool, a slide member mounted for rectilinear movement adjacent the grinding wheel, means for pivotally mounting said supporting arm on said slide member, said pivotal mounting means comprising a sleeve member secured to said slide member and having a bearing surface in each end thereof, the branches of said bifurcated arm overlying the ends of said sleeve member, supporting pins extending through said branches of said arm and engaging said bearing surfaces, means for adjustably positioning said supporting pins in the line of the pivotal axis, whereby the trimming tool may be so positioned with respect to the grinding wheel that the axis of rotation of the grinding wheel passes through the plane of rotation of the trimming tool cutting edge.

ADAM ROMAN.